(12) United States Patent
Stobbe et al.

(10) Patent No.: US 6,731,198 B1
(45) Date of Patent: May 4, 2004

(54) SECURITY SYSTEM, TRANSPONDER AND RECEIVER DEVICE

(75) Inventors: Anatoli Stobbe, Barsinghausen (DE); Hartmut Scheffler, Barsinghausen (DE)

(73) Assignee: Antaloli Stobbe, Barsinghausin (DE)

( * ) Notice: Subject to any disclaimer, the term of this patent is extended or adjusted under 35 U.S.C. 154(b) by 0 days.

(21) Appl. No.: 09/480,602

(22) Filed: Jan. 7, 2000

(30) Foreign Application Priority Data

Jan. 8, 1999 (DE) .......................................... 199 00 523

(51) Int. Cl.[7] .................................................. H04Q 5/22
(52) U.S. Cl. .................. 340/10.33; 340/10.2; 340/10.1; 340/10.4; 340/572.1
(58) Field of Search .............................. 340/10.2, 10.42, 340/10.1, 10.33, 10.32, 870.11, 572.1, 539.1, 572.4, 10.34, 10.4, 572.5, 568.1; 342/118; 235/375

(56) References Cited

U.S. PATENT DOCUMENTS

| | | | | |
|---|---|---|---|---|
| 4,023,167 | A | * | 5/1977 | Wahlstrom .................. 343/6.5 |
| 4,511,887 | A | * | 4/1985 | Fiore ........................... 340/539 |
| 4,656,463 | A | * | 4/1987 | Anders et al. .............. 340/572 |
| 5,218,343 | A | | 6/1993 | Stobbe et al. |
| 5,317,330 | A | * | 5/1994 | Everett et al. .............. 343/867 |
| 5,406,297 | A | * | 4/1995 | Caswell et al. ............. 343/743 |
| 5,450,492 | A | * | 9/1995 | Hook et al. .................... 380/28 |
| 5,515,036 | A | * | 5/1996 | Waraksa et al. ........ 340/825.72 |
| 5,539,394 | A | | 7/1996 | Cato et al. |
| 5,541,583 | A | | 7/1996 | Mandelbaum |
| 5,774,876 | A | * | 6/1998 | Woolley et al. ................ 705/28 |
| 6,044,333 | A | | 3/2000 | Stobbe et al. |
| 6,177,858 | B1 | * | 1/2001 | Raimbault et al. .......... 340/10.1 |
| 6,177,861 | B1 | * | 1/2001 | MacLellan et al. ......... 340/10.1 |
| 6,198,382 | B1 | * | 3/2001 | Berger et al. ............. 340/10.34 |
| 6,236,836 | B1 | * | 5/2001 | Westman et al. ........... 455/38.3 |
| 6,275,143 | B1 | | 8/2001 | Stobbe |
| 6,323,566 | B1 | * | 11/2001 | Meier .......................... 307/10.2 |
| 6,535,744 | B1 | | 3/2003 | Stobbe et al. |

FOREIGN PATENT DOCUMENTS

| | | |
|---|---|---|
| DE | 40 03 410 | 8/1991 |
| DE | 40 35 070 | 7/1992 |
| DE | 197 19 562 | 11/1998 |
| DE | 197 45 953 | 4/1999 |
| DE | 198 59 947 | 7/2000 |
| EP | 0 694 887 | 1/1996 |

* cited by examiner

Primary Examiner—Michael Horabik
Assistant Examiner—Vernal Brown
(74) Attorney, Agent, or Firm—Collard & Roe, P.C.

(57) ABSTRACT

A security system includes a base station and at least one transponder. A data dialogue takes place between the base station and the transponder in which the transponder sends back data to the base station on a carrier frequency in the RF (radio frequency) range. The transponder comprises a first transmitter and a second transmitter for data transmission to the base station and/or to a read/write device. The second transmitter sends on an electromagnetic carrier frequency in the LF (low frequency) range, and an audible carrier frequency in the ultrasonic range or an optical carrier frequency in the infrared range.

30 Claims, 3 Drawing Sheets

SECURITY SYSTEM, TRANSPONDER AND RECEIVER DEVICE

BACKGROUND OF INVENTION

1. Field of the Invention

The invention relates to a security system of a base station and at least one transponder. More particularly, the invention relates to a security system in which a data dialogue takes place between the base station and the transponder wherein the base station sends data to the transponder on a carrier frequency in the LF (low frequency) range and the transponder sends back data to the base station on a carrier frequency in the RF (radio frequency) range.

2. The Prior Art

Transponders are mobile electronic switching circuits, which serve primarily for the identification of persons, animals, or objects, and allow for data exchange with a base station without contact. Transponders are also used to track moving objects for logistical purposes or for securing items of value.

To monitor and control larger areas, an LF range is used for data transfer from the base station to the transponder. In the LF range, the impairment of the field through objects, especially of a metallic type, is very low and the penetration depth in materials is very high. However, a relatively high transmitting power is required for this.

The feedback transmission from the transponder to the base station on the other hand is by means of a carrier frequency in the RF range, since relatively large distances can be bridged here with very small antennae and a very low transmitting power. Because of the low battery capacity of the transponder a low transmitting power is of great significance in the interest of a long service life.

One problem consists in that transmissions in the RF range can be easily impaired through shadows or manipulation. In this way it would be possible to operate a jammer in the RF range used by the transponder or the transponder could be screened by wrapping in RF-impermeable metal foil.

In the older DE 19745963 A1, an anti-theft system is described wherein a base station and a transponder are operating in the LF range and at the same frequency. In order for the base station not to hinder the reception of the weak transponder signals, an antenna for the transponder signals with its considerably higher transmitting power must be arranged outside the effective range of the base station. Alternatively, the base station and the transponder must only send alternately. Moreover the receiver must additionally be blocked for the transponder signals while the base station is transmitting. Otherwise the adaptation times, in which the receiver of the transponder signals would able to adapt to the weak transponder signals after the fading of the strong signals of the base station, would be too long.

The spatial separation of the antenna for the transponder signals from the effective range of the base station would have to be so large because of the considerably higher transmitting power of the base station compared with the transmitting power of the transponder, that its realization in practice is excluded. The alternate allocation of transmitting times has the disadvantage that limiting the transmitting time further restricts the effective maximum data rate because of the lower maximum data rate with carrier frequencies in the NF range. In practice, this arrangement severely impairs or even renders impossible the simultaneous monitoring of several transponders.

SUMMARY OF THE INVENTION

The invention is based on creating a security system which still enables a bi-directional exchange of data between transponder and base station with adequate data rate even with interferences of a carrier frequency in the RF range.

In accordance with the invention, this task is solved by providing a security system having a base station and at least one transponder between which a data dialogue takes place wherein the base station sends data to the transponder on a carrier frequency in the LF range and the transponder sends back data to the base station on a carrier frequency in the RF range. Further details and advantageous embodiments of the invention are discussed below.

According to the invention, the transponder incorporates an additional transmitter for the transmission of data to the base station. The transmitter may have an electromagnetic carrier frequency in the LF range, an audible carrier frequency in the ultrasonic range or an optical carrier frequency in the infrared range. By switching over to this additional transmitter it is possible to avoid interference in the RF range. Although more energy is generally required to operate this transmitter, such is consciously accepted for data transmission in emergency cases.

Particularly advantageous is an electromagnetic carrier frequency in the LF range, for this has a very large penetration depth as already mentioned above. In this way, a data dialogue between the transponder and the base station may be maintained even if data transmission in the RF range would no longer be possible because of screening. Such screening could arise, for example, through the wrapping of the transponder in aluminum foil. On the other hand, the electromagnetic field is only affected to a minor extent because of the low penetration depth but not attenuated so severely that data transmission would no longer be possible.

Since the transmitting frequencies of transponder and base station in the LF range are different, they could be distinguished through means of selection. Transponders and base station can therefore be transmitting simultaneously and independent of each other. This enables the full utilization of the maximum data range available with the carrier frequency used and increases the probability that the weak transponder signal can be safely received and reliably evaluated even with field strength fluctuations or a rapid crossing of the local receiving range. The carrier frequency of the transmitter of the base station is preferably in the LF range up to 150 kHz. This low operating frequency distinguishes the system. A large penetration depth in materials is present in the system, and the homogeneity of the electrical fields is only affected to a minor degree by objects in the vicinity of the transmitter antennae. Installation even in the immediate vicinity of metal components is therefore possible. Contrary to high-frequency fields, no reflections occur which could lead to undesirable and changeable nulls or increases of the field strength. Moreover, the fields are hardly affected even by objects that have been dynamically introduced or translocated to the detection area. In addition to this, screening for manipulation purposes is not effective or only to a limited extent.

The carrier frequency of the first transmitter of the transponder in the RF range is preferably above 10 MHz. On the one hand this high frequency has the advantage that data communication in duplex mode is possible without reciprocal impairment of the transmission channels. On the other hand the high frequency has the advantage that the transponder requires only a very small antenna and a low transmitting power. In addition, atmospheric interferences and interferences from switching processes of other electrical devices are absent in this frequency range. Secure data transmission is thereby ensured in most cases.

However, the high frequency has the disadvantage that the electromagnetic fields can be very easily shadowed or screened. In order to compensate for this disadvantage in the case of interference, the carrier frequency of the second transmitter of the transponder in the NF range is also dimensioned up to 150 kHz. Consequently the same transmission characteristics as with the carrier frequency of the base station apply to data transmission to the transponder.

An exchange of data for testing the transmission paths is preferably initialized between the base station and the transponder at intervals and the result evaluated. This measure serves to provide information on the quality of the transmission paths. Consequently, it also provides information on a possible interruption or interference in one of the directions or in both directions. In this way it is possible to timely detect interferences or manipulation.

In the case of a faulty or failed exchange of data, the initialization of the exchange of data may be repeated at least once. This measure serves to distinguish short-term impairments from longer or permanent interferences. Short-term impairments may occur through limited nulls of the field or interferences through voltage peaks when switching electrical devices on and off. Longer or permanent interferences indicate a defect of the system or manipulation.

According to a further embodiment it is intended for the base station to send request signals to the transponder at intervals and wait for answer signals. If the answer signal is not received within a predetermined period of time, oe of three things may occur. Either (i) the request signal is repeated, (ii) a positive acknowledgment signal otherwise provided for the receipt of an answer signal is not sent, or (iii) a negative acknowledgment signal is sent to indicate the failure to receive the answer signal.

This procedure, with which the test is initialized from the base station, is a possibility of testing the transmission conditions in the RF range. In this case, the test must be conducted by the transponder for the base station is unable to distinguish whether the transponder has still received it but is unable to send answer signals in the RF range or whether the transponder is located outside the field of the base station.

In a further embodiment, the transponder counts the repetitions of request signals or the failure of positive acknowledgment signals for the reception of the answer signal. After a determined number of repetitions of the request signal or failure of the possible acknowledgment signal for the reception of the answer signal, or on receiving the negative acknowledgment signal for the failure of receiving the answer signal, a second transmitter in the transponder transmits data in the NF range.

The multiple requests by the base station or the failure of positive acknowledgment signals for the reception of the answer signal or the negative acknowledgment signal for a failure of receiving can be valued as criterion that the transmission path in the RF range is faulty or that other manipulation is present. In this case it is possible to raise an alarm signal through data transmission by means of the second transmitter in the LE range.

As an alternative, initialization is also possible through the transponder when testing. In this case the transponder sends attendance signals in the RF range to the base station at intervals and waits for positive acknowledgment signals for the reception of the attendance signals. The attendance signal is repeated upon failure of receiving such a positive acknowledgment signal in the RF range within a determined period of time.

In doing so the sending of a signal is also repeated in this way and this state monitored by the transponder itself. In an analogous way, a further embodiment provides for the transponder to count the repetitions of attendance signals upon failure of a positive acknowledgment signal and to send data to the base station in the LF range by means of a second transmitter after a predetermined number of repetitions of its attendance signal. Here the failure of a positive acknowledgment signal is valuated as a criterion for a fault in the transmission in the RF range.

In addition, it is possible to monitor at least the transmission path susceptible to interference or sabotage or both transmission paths from the base station and/or from the transponder for interference or occupancy. The exchange of data for testing the transmission paths is only initialized when the transmission paths have been verified free or not occupied.

In this way, it is clarified even in advance whether the conditions are suitable for a meaningful result when testing the transmission paths. Unnecessary occupancy of the transmission paths with test signals is avoided in this way. Since the exchange of data is always connected with increased energy consumption on the part of the transponder, this will also improve the energy household of the transponder battery. Apart from this, inconclusive tests and faulty interference messages are avoided.

Preferably, the transponder sends data in the LF range by means of a second transmitter only when the transmission paths have been verified free or not occupied. This serves to avoid false alarms when occupancy of the transmission paths could also have other causes. This arrangement also saves the battery of the transponder, since it is subjected to greater load for data transmission in the LF range than regularly in the RF range.

As an alternative, the data sent by the transponder in the LF range by means of a second transmitter and received by the base station may be evaluated in conjunction with the monitoring of the transmission paths for occupancy. In this way, the data may be considered valid only when the transmission paths have been verified free or unoccupied.

This measure is practical when the transponder fails to recognize occupancy of the transmission paths or no test is provided. In other words, a corrective is introduced here for instance when the transponder issues an alarm although the cause for the occupancy of the transmission paths could be a different one.

As a further variant the base station is able to send out status messages of the transponders identified or detected as attendant on the basis of the received identification or attendance signals of the transponder at intervals. These status messages are evaluated by the transponders.

With this procedure it is therefore not individual acknowledgment signals that are sent out by the base station as soon as a transponder sends attendance signals, but a message is sent out which is addressed to all transponders. The activity in this case emanates from the base station. All transponders located in the field will now be able to evaluate at the same time whether they are already or still considered attendant or not by the base station.

Furthermore, each transponder will be able to note the absence of its identity or attendance messages when evaluating the status messages. Immediately or after a predetermined number of repetitions of the status messages on absence of its identity or attendance messages, each transponder will transmit data in the LF range to the base station by means of a second transmitter.

In the case of a faulty transmission path or a faulty transmission channel in the RF range from the transponder to the base station, the data transmitted to the base station in the LF range can be used to raise an alarm.

Monitoring of the transmission path in the RF range and the testing of the transmissions there from the transponder to the base station provides a criterion for assuming a manipulation. For this reason the data then transmitted in the LF range, that is the additional transmission path, will serve to raise an alarm. In this way, personnel will be able to check immediately whether the alarm arises from merely a fault or whether it arises from a manipulation of the transmission path and then to determine the cause of such and to establish the party causing it.

It is possible for all transponders to send out the same alarm data set. Sending out the same data set has the advantage that the data set is already known, i.e. it does not need to be evaluated individually in which case all details of the data set would have to be recognized and distinguished. Consequently processes can be employed for reception and identification such as mathematical correlation methods with which it is possible to filter out weak transponder signals even in noise or with interference. This can be important when a relatively large area has to be monitored and an identification of the alarm data set is to be ensured even with large distances between transponders and receiving antennae and therefore low field strength of the useful signals.

As an alternative it is also possible for each transponder to send out an individual alarm data set. This variant is an option when secure data transmission and consequently a good evaluation of the received data sets is to be expected and a special identification of the transponder concerned is desired at the same time.

The alarm data set can alternatively be sent of f once, several times, at intervals or continuously.

With one-off transmitting, the battery of the transponder presumably will keep its capacity. Thus, after the securing of the device, no maintenance, for example, additional charging or replacement of the battery, will be required. However, there is a risk that the alarm message is not received.

Sending out alarm messages several times or at intervals increases the probability that the alarm message is received by a receiver of the base station or by an additional receiver outside the detection range. The intermittent loading of the battery extends also the total duration during which alarm is raised. However, there is still another risk, even though a reduced one, that the alarm is not recognized because of the interruptions in transmitting.

The last alternative of continuous alarm transmission offers a high detection safety. However, because of the large load on the battery the maximum duration of the alarm is considerably smaller than with multiple or intermittent transmitting.

In addition, it can be provided that the frequency at which data transmission is intended, is monitored for occupancy or interference by the transponder and/or the base station at least indirectly prior to the intended transmission.

This can be the carrier frequency in the RF range; however, monitoring in the LF range is also practical since manipulation or interference is possible there as well.

If the interference is caused by another system occupying the same channels only at times, it is sufficient to wait for the end of the occupancy of the frequency before dispatching the transmission. This measure has the advantage of distinguishing between different interferences and preventing collisions. In addition, the energy resources of the transponder are saved when it is obvious that its transmission cannot be received because of temporary frequency occupancy.

The transponder can be located outside the carrier frequency field of the base station in an energy-saving mode or a standby mode and is switched over to a working mode when entering the carrier frequency field of the base station. The battery service life of the transponder is considerably increased in this way. For example, only the receiver needs to be active for the standby mode, all remaining assemblies can be switched off.

It is further provided that the transponder is switched over to working mode by a wake-up signal from the base station and that in addition a channel is allocated to a time slot and/or to a carrier frequency via the wake-up signal.

This measure makes it possible by allocating a carrier frequency or a time slot to simultaneously distinguish the transponder during subsequent replies from other transponders located in the field with different channel allocations. In addition it is possible here to exclude channels recognized as occupied from data transmission in advance, and thereby improve the security of data transmission.

In addition it may be provided for the transponder to be in an energy-saving mode in a stationary state and to be switched over to a standby mode or a working mode when moving.

This measure goes still a step further and makes it possible to reduce the energy consumption in the state of rest almost to zero. Since security-related events occur normally only in the moving state, it is sufficient to use a movement detector which, upon detecting movements, switches the transponder to standby mode or a working mode. In a standby mode only the receiver would be supplied with energy so that its energy consumption would be lower even then. The energy consumption of all assemblies is enabled only when the transponder is introduced into the field of a base station.

According to a further embodiment, the transponder in standby mode or in energy-saving mode can be switched over to an active state through a strong electromagnetic field in the LF range.

This operating mode is practical when transponders for instance are attached to stored items of value or are integrated in such and a dialogue with a mobile read and/or write ("read/write") device is desired in the stored position. Such may occur for instance when stock levels are to be queried or even when the status of the batteries of the transponders is to be checked after a prolonged storage period.

In this case a strong electromagnetic field will enable activation while the transponder will react like a passive of the read/write device.

A further embodiment provides for the transponder to send with reduced transmitting power after changing over to the active state. This is acceptable because in order to generate the strong electromagnetic field for waking up the transponder in the stationary state, it is necessary to get very close to the transponder with the read/write device antenna. Accordingly, low transmitting power is also required for the feedback transmission from the transponder to the read/write device which is practical in the interest of saving the battery installed in the transponder.

The transponder is able to use the coil of an LC resonant circuit as antenna for the LF range. In this way no additional antenna is required and the efficiency of the lower frequency when using a coil is even larger than with an extreme electrically shortened wave transmitter.

Preferably the same coil of the LC resonant circuit will be used for receiving and transmitting by changing the resonant circuit over from the receiver to the transmitter. The resonant circuit in each case is matched to the receiving and transmitting frequencies.

In this way it is possible to jointly use components and consequently design the size of the transponder as small as possible. The LC resonant circuit is preferably operated in parallel resonance during receiving and switched over to series resonance during transmission.

With parallel resonance the electromagnetic field generates a maximum voltage at the place of reception which triggers a maximum signal level at the input stage of the LF receiver. During transmission, however, a low-ohmic behavior of the LC resonant circuit is required to enable the transmitter to feed as large a current as possible into the resonant circuit and achieve as strong as possible an electromagnetic field. By switching over, the coil utilizing the magnetic component of the electromagnetic field is therefore operated preferably at an optimum in both receiving and transmitting modes.

According to a further embodiment it is possible to measure the resonance of the LC resonant circuit before or during transmission and the LC resonant circuit can be tuned to the transmission frequency if its resonant frequency differs from the transmission frequency.

This measure is useful since the resonant frequency of the LC resonant circuit may possibly be changed during manipulation attempts with metallic screening foil. Such attempts no longer guarantee optimum tuning between antenna and transmitter and impair the range. Since screening always results in a certain attenuation and consequently reduction in range, additional detuning would reduce the range. When detecting detuning at least that effect can be compensated by tuning to the resonant frequency. Of course this applies also when ferritic material is deliberately brought in the vicinity of the transponder coil for manipulation purposes in order to detune the resonant frequency.

The transponder can comprise at least two antenna coils offset relative to each other. In this way it is possible to change the otherwise pronounced directional characteristic of a single coil in a manner so that an almost all-round characteristic is achieved.

The base station may comprise several spaced out RF receivers with receiving antennae with which the signals transmitted by the transponder can be evaluated in diversity mode. In this way it is possible to largely eliminate shadows and even nulls of the fields when receiving the transponders. False alarms which would otherwise occur with a faulty RF transmission path because of such causes are avoided in this way.

In addition it is provided that the receiving antennae in the base station for the LF range are decoupled from the transmitting antennae for the LF range. In this way, the receivers for the LF range are able to be set to the greatest possible sensitivity to achieve as large as possible a range in the LF range despite the low transmitting power of the transponders.

Furthermore, the invention concerns a transponder for a security system wherein the LC resonant circuit is operated in parallel resonance on receiving and is switched over to series resonance when transmitting.

In this regard the task is based on creating a transponder which still enables transmission to the base station even with interferences on a carrier frequency in the HF range.

In accordance with the invention, the transponder comprises a further transmitter device for data transmission to the base station and/or to a read/write device. This transmitter device transmits on an electromagnetic carrier frequency in the LF range, an audible carrier frequency in the ultrasonic range or an optical carrier frequency in the infrared range, while the base station and the transponder transmit on different carrier frequencies in the LF range.

The invention also concerns a receiver device, wherein the resonance of the LC resonant circuit is measured before or during transmission. The LC resonant circuit is tuned to the transmission frequency if its resonant frequency differs from the transmission frequency. In this regard, the task is based on creating a receiver device for a security system which permits a reception of the data transmitted by the transponder even with interferences of a carrier frequency in the RF range. transmission frequency if its resonant frequency differs from the transmission frequency. In this regard, the task is based on creating a receiver device for a security system which permits a reception of the data transmitted by the transponder even with interferences of a carrier frequency in the HF range.

In accordance with the invention, the receiver device of the base station comprises at least one receiver which receives on an electromagnetic carrier frequency in the LF range, an audible carrier frequency in the ultrasonic range, or an optical carrier frequency in the infrared range, while the base station and the transponder send on different carrier frequencies in the LF range. Further embodiments are discussed below.

The effects of the characteristics of the transponder and the receiver device correspond to the characteristics as explained previously in connection with the corresponding characteristics of the security system.

By means of selection in the receiver device and/or a spatial separation of the receiving antennae for transponder signals in the LF range it is possible to effectively decouple the transmitting signals from base station and transponder. As a result, a large range for the transponder signals with good detection is achieved.

DESCRIPTION OF THE DRAWINGS

Other objects and features of the present invention become apparent from the following detailed description considered in conjunction with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
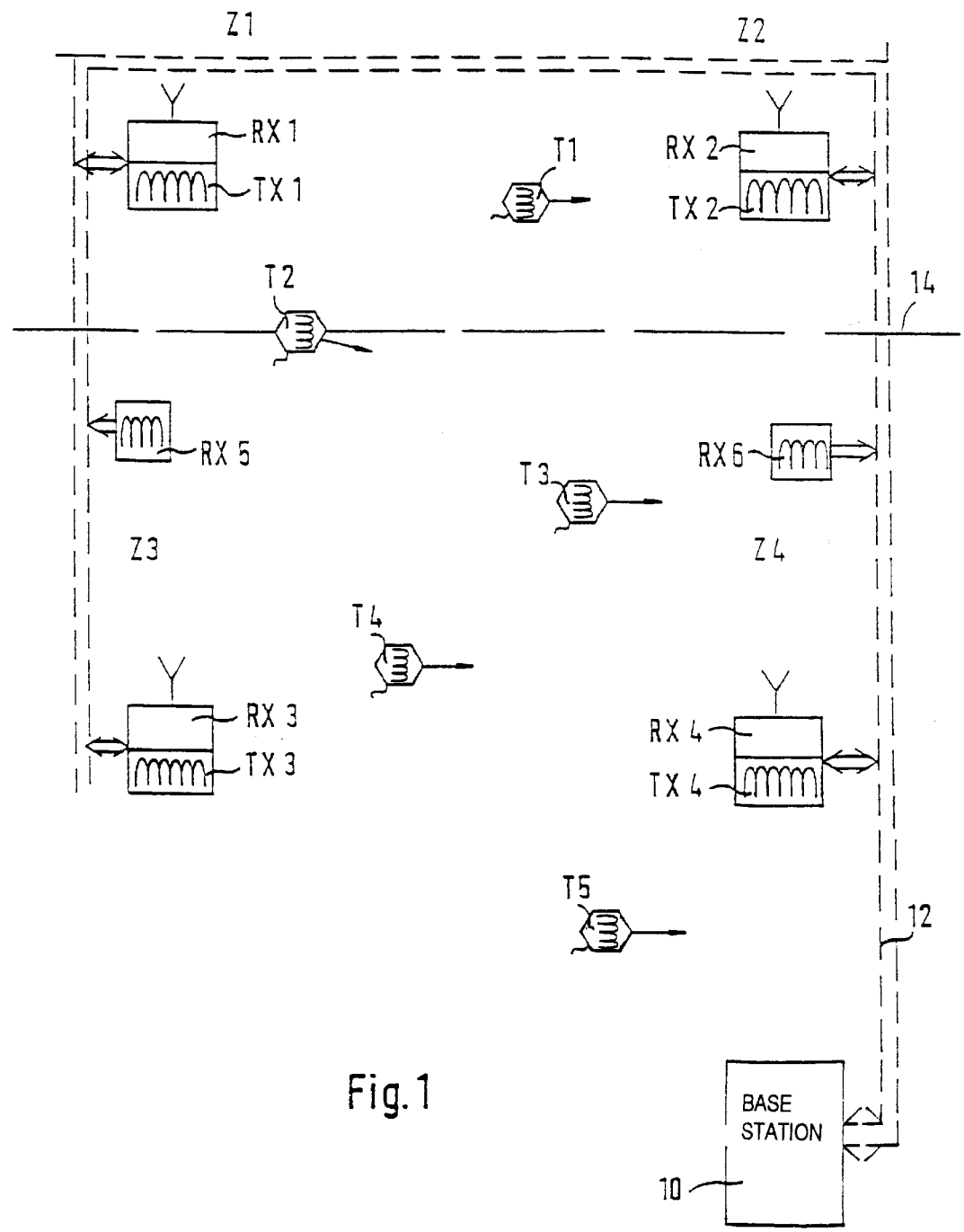
FIG. 1 is a schematic representation of a security system in a detection area.

FIG. 1 shows a schematic arrangement of a security system in a detection area with a total of four cells Z1, Z2, Z3, Z4 in which transponders T1, T2, T3, T4, T5 are located. The four cells Z1, Z2, Z3, Z4 are controlled by a common base station 10.

An application example could be the entrance and exit areas of a service company employing both in-house employees and field employees who use notebook computers to accomplish their tasks, and which they can take along from the building.

In order to monitor the authorized and unauthorized taking of the computers, all units are equipped with transponders T1, T2, T3, T4, T5. These transponders possess a receiver operating in the LF range at 8 kHz, an evaluation and control circuit, a transmitter operating in the RF range at 433 MHz and an additional transmitter operating in the LF range at 14 kHz, receiving and transmitting antennae and a battery.

The cells Z1, Z2, Z3, Z4 of the detection area constitute the receivable electromagnetic fields of transmitter devices TX1, TX2, TX3, TX4 with antennae which, locally separated, are provided at 4 points of the ceiling in the entrance and exit areas of the building and are connected with a common base station 10. Additionally present are several receiver devices RX1, RX2, RX3, RX4 for the RF range with receiving antennae. Receiver devices RX5, RX6 for the LF range are also connected with the base station 10.

The transmitter devices TX1, TX2, TX3, TX4 are synchronized with the base station 10 via a data bus 12 and transmit electromagnetic fields in the LF range, at about 8 kHz. The electromagnetic fields differ from one another in the four cells Z1, Z2, Z3, Z4. Through the differences of characteristics of the electromagnetic fields it is possible to determine the positions of the transponders T1, T2, T3, T4, T5. In this way it can be determined whether the transponder with the object of value is located in a generally authorized area or in an area requiring special authorization.

The receiver devices RX1, RX2, RX3, RX4 for the RF range, which scan several reception channels and transmit the results to the base station, are advantageously located at the same antennae locations. In contrast, the receiver devices RX5, RX6 for a second return channel in the LF range are located at a distance from the transmitter devices TX1, TX2, TX3, TX4. In this way, the greatest possible decoupling, and thereby low direct scatter, are achieved.

If an employee were now to take a computer which is connected to a transponder of this type, T1 . . . T5, into the detection area of the entrance and exit area of the building, the transponder T will pass into the field of one of the cells Z1, Z2, Z3, Z4 of the detection area. The transponder had been in an energy-saving mode at first in which the transponder did not use any or very low electric energy. Thereafter, it was switched to a standby mode as a result of lifting and transporting the device with the transponder through the detection by a movement detector or acceleration pickup in the transponder. Only the receiver of the transponder is active in the standby mode.

As soon as the transponder T1 enters one of the cells Z1, Z2, Z3, Z4 of the detection range, it is switched over to a working mode in which the received data can be evaluated. In doing so the transponder T1 is also allocated a channel in form of a time slot and/or a frequency by the wake-up signal which switches it over from standby mode to working mode.

The base station 10 causes all transponders T1, T2, T3, T4, T5 located in the cells Z1, Z2, Z3, Z4 to transmit an answer signal to a request signal at intervals. The control device of the transponders consequently induces an answer in the HF range. This answer contains details of the position within the detection range. It can also contain details concerning authorization for entering an area requiring authorization. If the position corresponds with a cell that can only be entered with special authorization and the authorization required for this is not available, an alarm message will be raised.

Corresponding request signals are cyclically sent by the base station 10 and answer signals awaited and evaluated by the transponders. If the answer signal received by the base station 10 is evaluated as valid, an additional request signal is sent only in the next cycle. However, if no answer signal is received or evaluated as valid, the request signal is repeated or an acknowledgement signal for failure of receiving is sent out. As an alternative a status signal can be sent out cyclically by the base station 10 containing the identification or attendance messages of the "heard" transponders T. By evaluating the status signals each transponder T in turn is able to determine whether it has been detected as "attendant" by the base station 10, or not.

An interruption of the RF transmission path can occur when an unauthorized person wraps the transponder in metal foil to screen the transmitter for the RF range with the intention of manipulating the security system. The transponder now repeats its answer signal several times and registers the number of repetitions. A predeterminable number of unsuccessful repetitions constitutes a criterion for a faulty transmission path between the transponder T1 and the base station 10. In this case the transponder T1 enables its second transmitter in the LF range and transmits an alarm message. This alarm message is received by one of the receivers RX5, RX6 of the base station 10 for the LF range and evaluated by the base station 10.

It is possible to establish a sabotage monitoring arrangement for instance when the operating frequency for the cells, the return channel or the RF range are monitored for interference transmissions especially prior to each transmission and on expected feedback message or before the allocation of a return channel at regular intervals.

Figure 2:
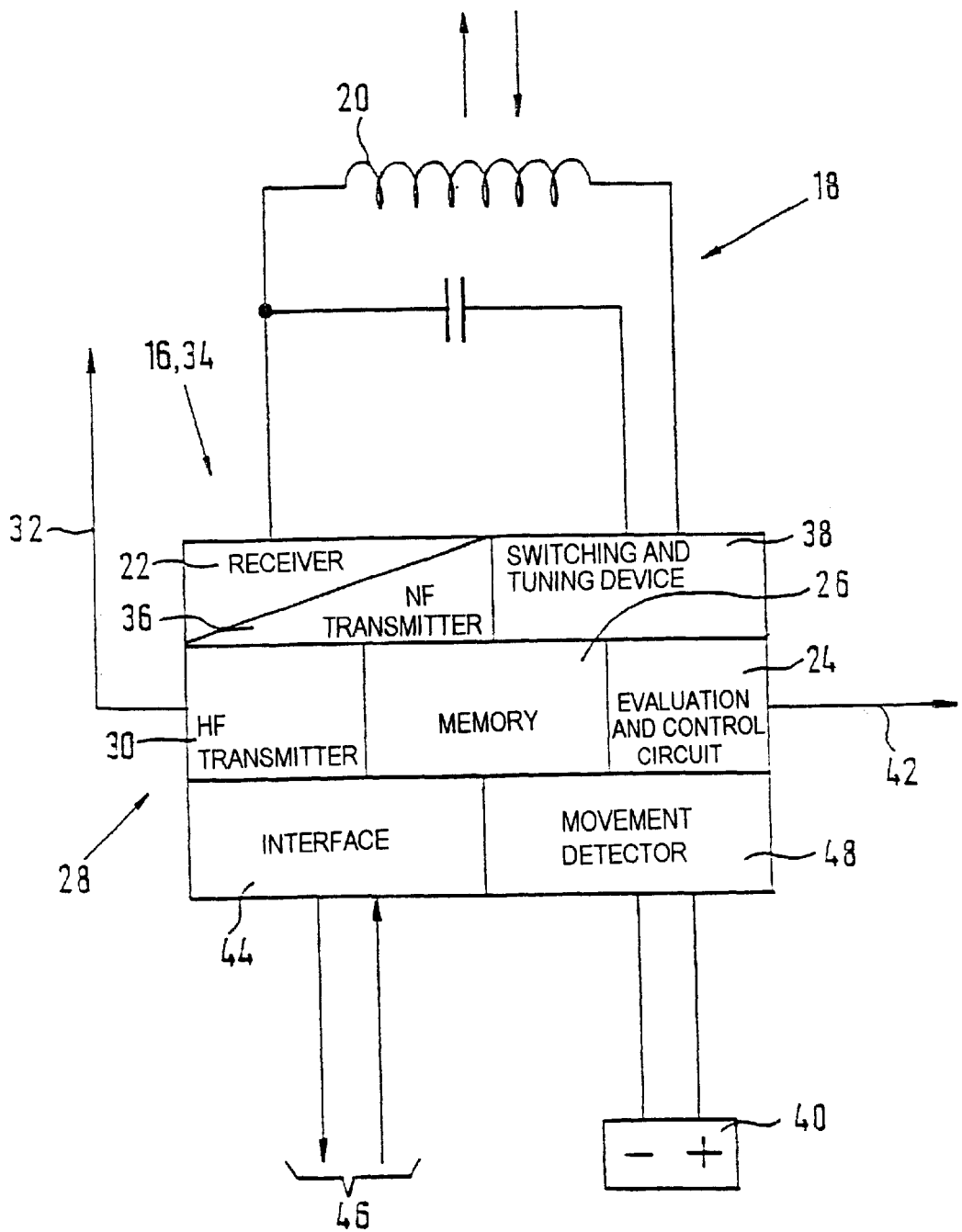
FIG. 2 is a block circuit diagram of a transponder.

FIG. 2 shows a block circuit diagram of a transponder T1 suitable for the system described. This comprises a receiver device 16 for the operating frequency of 8 kHz, consisting of an LC resonant circuit 18 with a coil 20 serving simultaneously as an antenna, and a receiver 22, an evaluation and control circuit 24 with a memory 26, a first transmitter device 28, consisting of an RF transmitter 30 for 433 MHz and an antenna 32, a second transmitter device 34, consisting of an LF transmitter 36 for 14 kHz and the coil 20 of the existing LC resonant circuit 18 as an antenna supplemented by a switching and tuning device 38 and an energy source 40. The evaluation and control circuit 24 has an output 42 for actuating an optical or audible signal generator, or a device for marking, rendering invalid, or blocking of items of value. In addition an interface 44 with an input and output port 46 for an electronic device can be provided. Finally, the transponder includes a movement detector 48 in the form of an acceleration sensor which is connected with the evaluation and control circuit 24. At the same time the tuning device contains a sensor for a tuning quantity, for instance the resonant circuit current and a comparator. When the transponder is at rest, which is determined by the movement sensor 48, the energy consumption is negligible. Except for the part of the evaluation and control circuit 24 responsible for evaluation of movement sensor 48, all transponder assemblies are switched off. The current to cover the energy requirement is then approximately on the order of the self-discharge current of the battery.

The energy-saving mode in the state of rest is considered acceptable for security purposes since it is necessary for security-related actions to move the transponder and the object of value connected with it.

If a movement is detected by the movement sensor 48, only the receiver device 16 for the operating frequency of 8 kHz is enabled at first by the part of the evaluation and control circuit 24 allocated to the movement sensor 48. The remaining assemblies of the transponder T1 remain switched off. The energy consumption consequently still remains below a value that would lead to a rapid discharge of the energy source 40. Activating the receiver device 16, however, ensures that all remaining assemblies can be enabled when the transponder T1 enters the effective range of a base station. In this case, characterized by the reception of the field transmitted by the base station 10, the evaluation and control circuit 24 as well as the transmitter device are enabled so that the transponder T1 is able to be registered attendant by the base station. In addition, it is now possible to evaluate the fields characterizing the individual cells in order to determine the positions. For determining these positions is to be the very criterion that determines whether the transponder T1 is in an authorized area or in an area subject to special authorization.

Normally only the first transmitter device 28 with the RF transmitter 30 is used for the return channel, that is for data transmission from the transponder T1 to the base station 10. The RF transmission path from the transponder T1 to the base station 10 is then utilized to identify the transponder T1, and to transmit the position detected by the transponder T1 in the detection range to the base station 10. Additionally, the RF transmission path is used to recognize manipulation directed at interfering or interrupting the transmission path in the RF range from the transponder T1 to the base station 10. If no manipulation is detected, i.e. the transmission path in the RF range is operating perfectly, positions of the transponder T1 are regularly reported to the base station 10 in the RF range. With manipulations of the RF transmission path however the second transmitter device 34 is switched over and the transmission conducted in the LF range.

Despite interruption of the RF transmission path, an alarm data set can be sent off via the second transmission path in the LF range. The alarm data in this range can be received by one or several receivers of the base station or by separate receivers. It is then possible to transmit individual data sets for the different transponders or generally the same data set for all transponders. Apart from this the alarm message can be sent once, several times, at intervals or continuously. transponders. Apart from this the alarm message can be sent once, several times, at intervals or continuously.

Figure 3:
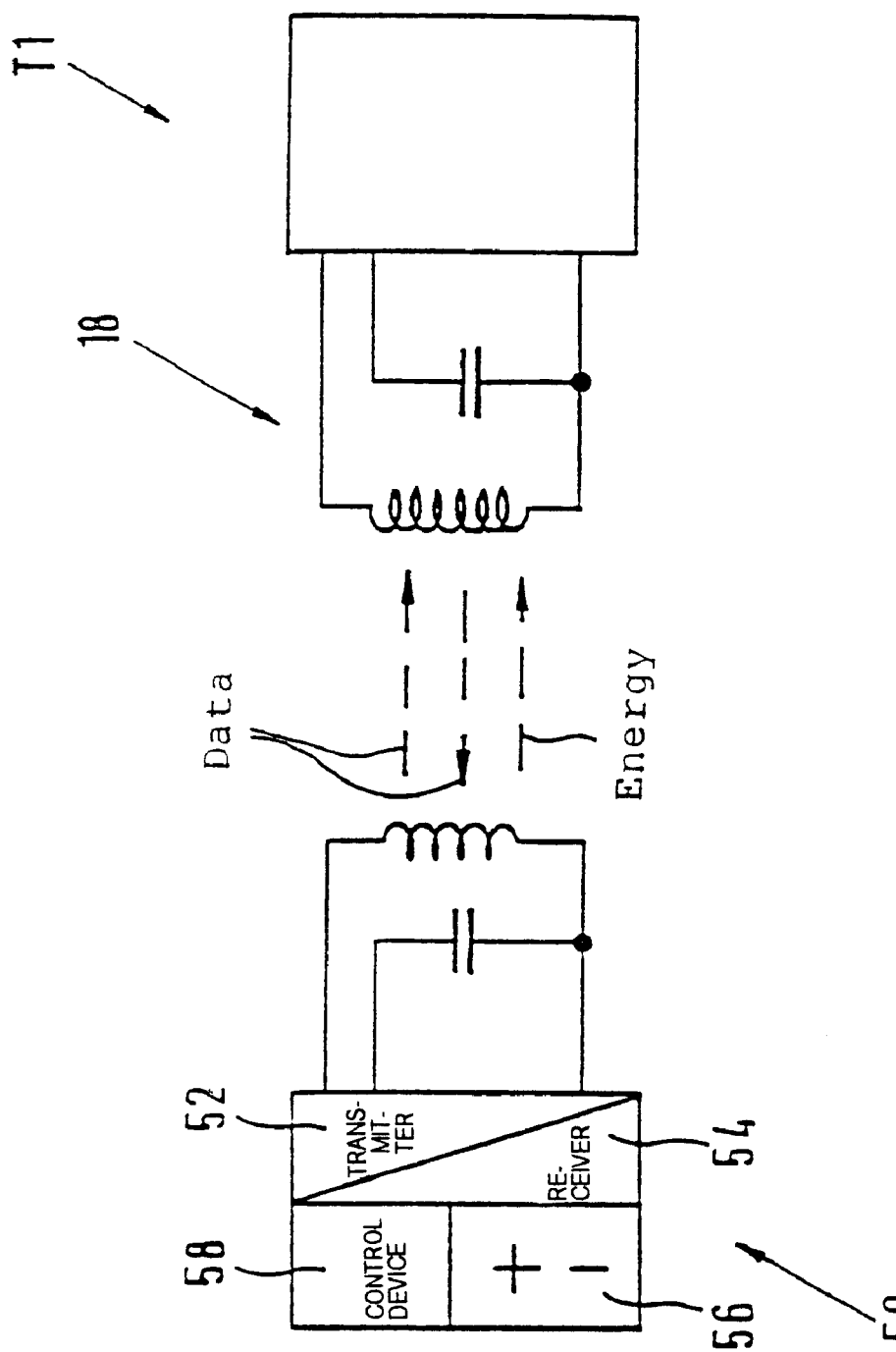
FIG. 3 as a schematic representation of a data communication system with a read/write device and a transponder.

FIG. 3 shows a schematic representation of a dialogue between a mobile read/write device 50 and a transponder T1.

This representation shows a transponder T1 which is located outside the detection range of a base station 10, for instance a storage area for items of value. It is assumed that this transponder T1 is also equipped with a movement sensor 48 and the transponder T1 is in the state of rest in an energy-saving mode.

By means of the transponder it would generally be possible to determine identification data which permits an overview of the stored items of value. In addition, it could be useful to obtain information on the charge status of the energy source 40 in the transponder T1. Such information is useful in order to take timely precautions with items of value stored for prolonged periods of time to prevent the security system from becoming unoperational through depletion of the energy source 40 located in the transponder T1.

In order to be able to create the desired dialogue with the transponder T1 in this situation, the transponder has been designed so that it can be enabled by a strong electromagnetic field which is considerably larger than the receiving electromagnetic field from the base station. Here the transponder T1 behaves like a passive transponder, i.e. its assemblies are supplied with energy by the read/write device. It is now possible to conduct data communication between the transponder T1 and the read/write device 50 exclusively in the energy-saving mode of the transponder T1 or that the transponder T1 is woken up and enters into dialogue using its own energy source 40. However, a mode can be set here, in which the transponder T1 operates only with reduced transmitting power.

FIG. 3 shows the transponder T1 as described in FIG. 2 in dialogue with a read/write device 50. Read/write device 50 consists of a transmitter device 52, a receiver device 54, a control device 58 and an energy source 56. Energy transmission is by means of the transmitter device 52.

In notebook computers, for example, the transponder T1 may be integrated in the computer itself, and, for example, enable or disable the BIOS. In this case, it would be to advantageous to use the standard fitted battery of the computer, such as the battery for the clock. In addition, all the components of the transponder T1 can be arranged on the common CPU board in the computer.

In this embodiment, the transponder T1 would communicate both via a wire interface to the CPU board, as well as via the wireless media already described to the base station, or to other writing/reading devices 50. Other appliance characteristics, such as serial number and fittings, can then also be transmitted to the read/write device without contact.

While several embodiments of the present invention have been shown and described, it is to be understood that many changes and modifications may be made thereunto without departing from the spirit and scope of the invention as defined in the appended claims.

What is claimed is:

1. A security system comprising
   (a) a base station, and
   (b) at least one transponder having a first transmitter device, a dialogue taking place between said base station and said transponder wherein the base station sends data to the transponder on a carrier frequency in the LF (low frequency) range and the transponder sends back data to the base station on a carrier frequency in the RF (radio frequency) range, said transponder comprising a second transmitter device for data transmission to a destination selected from the group consisting of the base station and a read/write device, said second transmitter device sending on a frequency selected from the group consisting of an electromagnetic carrier frequency in the LF range, an audible carrier frequency in the ultrasonic range and an optical carrier frequency in the infrared range while the base station and the transponder transmit on different carrier frequencies in the LF range;

wherein the base station, because of received identification or attendance signals of the transponders sends out status messages of the transponders identified or registered attendant at intervals and the transponders evaluate the status messages; and wherein the transponder, which on evaluation of the status messages discovers the absence of its identity or attendance messages, immediately or after a predetermined number of repetitions of the status messages upon absence of its identity or attendance messages, sends out data to the base station in the LF range by means of the second transmitter device.

2. A security system according to claim 1, wherein the base station comprises first and second transmitter devices and the carrier frequency of the second transmitter devices of the base station is in the LF range up to 150 kHz.

3. A security system according to claim 1, wherein the carrier frequency of the first transmitter device of the transponder is in the RF range above 10 MHz.

4. A security system according to claim 1, wherein the carrier frequency of the second transmitter device of the transponder is in the LF range up to 150 kHz.

5. A security system according to claim 1, wherein an exchange of data for testing the transmission paths is initialized at intervals and the result evaluated between the base station and the transponder.

6. A security system according to claim 5, wherein the initialization of the exchange of data is repeated at least once if the exchange of data is faulty or fails.

7. A security system according to claim 5, wherein the base station sends request signals to the transponder at intervals and waits for answer signals and, if no answer signals are received within a predetermined period of time, repeats the request signal or does not send a positive acknowledgment signal otherwise provided for the reception of an answer signal or sends a negative acknowledgment signal for a failure of receiving an answer signal.

8. A security system according to claim 7, wherein the transponder further comprises an LF transmitter and wherein the transponder counts the repetitions of request signals or the absence of positive acknowledgment signals for the reception of an answer signal and, after a predetermined number of repetitions of the request signal or absence of the positive acknowledgment signals for the reception of the answer signal or on receiving the negative acknowledgment signal for the failure of receiving the answer signal, sends data in the LF range by means of the LF transmitter.

9. A security system according to claim 5, wherein the transponder sends attendance signals in the RF range to the base station at intervals and waits for positive acknowledgment signals for the reception of the attendance signals and repeats the attendance signal within a predetermined period of time on failure to receive such a positive acknowledgment signal.

10. A security system according to claim 9, wherein the transponder counts the repetitions of its attendance signal on the absence of a positive acknowledgment signal and, after a predetermined number of repetitions of its attendance signal, sends out data in the LF range to the base station by means of the second transmitter device.

11. A security system according to claim 8, wherein at least the transmission path threatened by interference or sabotage or both transmission paths are monitored by the base station or by the transponder for interference or occupancy and that the exchange of data for testing the transmission path is only initialized when the transmission paths have been verified free or not occupied.

12. A security system according to claim 8, wherein the transponder sends out data in the LF range by means of the LF transmitter only when the transmission paths have been verified free and not occupied.

13. A security system according to claim 8, wherein the data sent by the transponder in the LF range by means of the LF transmitter and received by the base station in conjunction with the monitoring of the transmission paths is evaluated for occupancy and only evaluated as valid if the transmission paths have been verified free and not occupied.

14. A security system according to claim 6, further comprising an alarm and wherein the data transmitted in the case of a faulty transmission path or a faulty transmission channel in the RF range from the transponder tot he base station in the LF range serves to trigger the alarm.

15. A security system according to claim 14, wherein each transponder has an alarm data set and all transponders send out the same alarm data set.

16. A security system according to claim 14, wherein each transponder sends out an individual alarm data set.

17. A security system according to claim 15, wherein the alarm data set is sent out once, several times, at intervals or continuously.

18. A security system according to claim 1, wherein the frequency on which a data transmission is intended is monitored for occupancy or interference by the transponder or by the base station at least indirectly before the intended transmission.

19. A security system according to claim 1, wherein the transponder is outside the carrier frequency field of the base station in an energy-saving mode or a standby mode and upon entering the carrier frequency field of the base station, the transponder is switched over to a working mode.

20. A security system according to claim 19, wherein the transponder is switched over to working mode by a wake-up signal of the base station and wherein a channel allocation to a time slot or to a carrier frequency is conducted via the wake-up signal.

21. A security system according to claim 19, wherein the transponder is in a stationary state in an energy-saving mode and the transponder is switched over to a standby mode or a working mode in the case of movement.

22. A security system according to claim 19, wherein the transponder, in standby mode or in energy-saving mode is switched over by a strong electromagnetic field in the LF range from the standby mode or energy-saving mode to a mode in which transmitting power is derived from the strong electromagnetic field.

23. A security system according to claim 22, wherein the transponder, after the change-over to the mode in which transmitting power is derived from the strong electromagnetic field transmits with reduced transmitting power.

24. A security system according to claim 1, wherein the transponder further comprises an LC resonant circuit having a coil, the coil of the LC resonant circuit being used by the transponder as an aerial for the LF range.

25. A security system according to claim 24, wherein the transponder comprises a receiver and an RF transmitter and said coil of the resonant circuit is used for both receiving and transmitting by switching the resonant circuit over from the receiver to the RF transmitter and the resonant circuit is tuned to the receiving or transmission frequency as applicable.

26. A security system according to claim 25, wherein the LC resonant circuit is operated in parallel resonance on receiving and is switched over to series resonance when transmitting.

27. A security system according to claim 25, wherein the resonance of the LC resonant circuit is measured before or during transmission and the LC resonant circuit is tuned to the transmission frequency if its resonant frequency differs from the transmission frequency.

28. A security system according to claim 24, wherein the transponder comprises at least two aerial coils which are offset with respect to each other.

29. A security system according to claim 25, wherein the base station comprises several RF receivers with receiving antennae spatially distanced from each other, with which the signals transmitted by the transponder are evaluated in diversity mode.

30. A security system according to claim 29, wherein the receiving antennae in the base station for the LF operation are decoupled from the transmitting antennae for the LF range.

* * * * *

UNITED STATES PATENT AND TRADEMARK OFFICE
CERTIFICATE OF CORRECTION

PATENT NO.    : 6,731,198 B1
DATED         : May 4, 2004
INVENTOR(S)   : Stobbe et al.

It is certified that error appears in the above-identified patent and that said Letters Patent is hereby corrected as shown below:

Column 13,
Line 63, after the word "transponder" please change "tot he" to correctly read:
-- to the --.

Signed and Sealed this

Ninth Day of November, 2004

JON W. DUDAS
*Director of the United States Patent and Trademark Office*